(12) United States Patent
Ogiwara

(10) Patent No.: US 7,282,684 B2
(45) Date of Patent: Oct. 16, 2007

(54) OPTICAL PICKUP APPARATUS

(75) Inventor: Kenji Ogiwara, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 11/340,588

(22) Filed: Jan. 27, 2006

(65) Prior Publication Data

US 2006/0171285 A1 Aug. 3, 2006

(30) Foreign Application Priority Data

Feb. 2, 2005 (JP) .............................. 2005-026873

(51) Int. Cl.
*G11B 7/00* (2006.01)
(52) U.S. Cl. .............................. 250/201.5; 369/112.01; 369/112.16
(58) Field of Classification Search ............. 250/201.5; 369/112.01, 112.02, 112.03, 112.04, 112.05, 369/112.16
See application file for complete search history.

(56) References Cited

U.S. PATENT DOCUMENTS

| | | | |
|---|---|---|---|
| 2005/0063282 A1* | 3/2005 | Takada et al. | 369/112.04 |
| 2005/0254399 A1* | 11/2005 | Kimura | 369/112.23 |
| 2006/0002280 A1* | 1/2006 | Ogiwara | 369/112.23 |
| 2006/0062103 A1* | 3/2006 | Ogiwara et al. | 369/44.23 |
| 2006/0077792 A1* | 4/2006 | Kimura et al. | 369/44.23 |
| 2006/0077793 A1* | 4/2006 | Kimura et al. | 369/44.23 |
| 2006/0077861 A1* | 4/2006 | Katsuma et al. | 369/112.16 |
| 2006/0164954 A1* | 7/2006 | Hashimura | 369/112.01 |

* cited by examiner

*Primary Examiner*—John R. Lee
(74) *Attorney, Agent, or Firm*—Finnegan, Henderson, Farabow, Garrett & Dunner, L.L.P.

(57) ABSTRACT

An optical pickup apparatus is provided with a light source device to emit selectively an ordinary polarized light ray and an extraordinary polarized light ray by controlling a polarization condition of a light flux having a wavelength of λ1; and a light converging optical system. An objective lens has a phase structure made of a doubly refracting medium in which an ordinary ray refractive index $n_o$ for the ordinary polarized light ray is different from an extraordinary ray refractive index $n_e$ ($n_e \neq n_o$) for the extraordinary polarized light ray so that the phase structure has a function for not changing a transmitted wavefront of an incident light ray being one of the ordinary polarized light ray and the extraordinary polarized light ray and for changing a transmitted wavefront of an incident light ray being the other one of the ordinary polarized light ray and the extraordinary polarized light ray.

11 Claims, 7 Drawing Sheets

OPTICAL AXIS L

OPTICAL AXIS L

OPTICAL PICKUP APPARATUS

This application is based on Japanese Patent Application No. 2005-026873 filed on Feb. 2, 2005, in Japanese Patent Office, the entire content of which is hereby incorporated by reference.

BACKGROUND OF THE INVENTION

The present invention relates to an optical pickup apparatus capable of appropriately recording and or reproducing information onto or from optical information recording media by particularly using light sources having different wavelengths.

In recent years, the research and development of high density optical discs onto or from which information can be recorded or reproduced by using blue violet laser rays have been rapidly proceeded. For example, with regard to so called a Blue-ray Disc (it will be called BD from now on) onto or from which information is recorded or reproduced by using a light source having wavelength of 405 nm and an objective lens having NA of 0.85, it is possible to record 20-30 GB information onto a single side recording surface on an optical disc having diameter of 12 cm which is the same diameter of DVD (NA: 0.6, light source having wavelength 650 nm and a recording capacity: 4.7 GB). Also in the case of so called DH DVD (it will be called HD from now on) onto or from which information is recorded or reproduced by using a light source having wavelength of 405 nm and an objective lens having NA of 0.65, it is possible to record 15-20 GB information in a single side recording surface on an optical disc having diameter of 12 cm.

It is not good enough for the value of a product as an optical disc player or a recorder just having capability of appropriately recording and or reproducing information onto or from a single high-density optical disc. It is required to appropriately record and or reproduce information onto or from different kinds of high-density optical discs. Further, it is not good enough for the value of a product as an optical disc player or a recorder having only capability of recording and or reproducing information on to a high-density optical disc based on the fact that BD and HD will be sold in a mixed state in a marketplace. It is required to have capability of appropriately recording and or reproducing information onto or from the other high density optical disc in order to increase the product value of an optical disc player/recorder for high-density optical discs. It is difficult to form an appropriate focal spot onto each high density optical disc by using the same light converging optical system since the thickness of the protective layer of BD (t1) is 0.1 mm, the numerical aperture is 0.85, and the thickness of the protective layer of HD (t2) is 0.6 mm and the numerical aperture is 0.65. Further, there is a problem that the cost of the light converging optical system becomes high when separately providing light converging optical systems for BD and HD.

Japanese Patent Application Open to Public Inspection (TOKUHYOU) No. JP2004-516594 discloses an optical pickup apparatus capable of recording and or reproducing information onto or from DVD and DVR having different numerical apertures by using a diffraction grating for generating diffracted light rays having different order against polarization directions and a polarizing device with light rays having a single wavelength.

However, in the optical pickup apparatus disclosed in JP2004-516594, the diffraction grating is provided on the optical surface of an objective lens through which convergent light rays pass. The diffraction grating has a stepping structure having a zonal structure or a blaze type zonal structure. However, there is a problem that when passing the convergent light rays, the light ray amount of spot light rays becomes low resulting from shading or eclipse caused by the phenomenon that the light rays are blocked at the side of the zonal structure.

SUMMARY OF THE INVENTION

An object of the present invention is to provide an optical pickup apparatus capable of appropriately record and or reproduce information onto or from different kinds of optical information recording media by using light rays having the same wavelength to solve the problems associated with a prior art.

The above object can be attained by the following structure:

An optical pickup apparatus, comprises:

(1) a light source device to emit selectively an ordinary polarized light ray and an extraordinary polarized light ray by controlling a p polarization condition of a light flux having a wavelength of $\lambda 1$;

(2) a light converging optical system having an objective lens and for converging a light flux having the wavelength of $\lambda 1$ onto an information recording surface of a first optical information recording medium through a protective layer having a thickness of t1 or onto an information recording surface of a second optical information recording medium through a protective layer having a thickness of t2 different from t1 (t1≠t2); and (3) an optical detector for receiving a reflected light from the information recording surface of the first optical information recording medium and the second information recording medium and for outputting a signal;

wherein the objective lens has a phase structure on one of optical surfaces through which a parallel light flux is transmitted, the phase structure is made of a doubly refracting medium in which an ordinary ray refractive index $n_o$ for the ordinary polarized light ray is different from an extraordinary ray refractive index $n_e$ ($n_e \neq n_o$) for the extraordinary polarized light ray and an optical axis of a refractive index ellipsoid is aligned in a single direction so that the phase structure has a function for not changing a transmitted wavefront of an incident light ray being one of the ordinary polarized light ray and the extraordinary polarized light ray and for changing a transmitted wavefront of an incident light ray being the other one of the ordinary polarized light ray and the extraordinary polarized light ray.

DETAILED DESCRIPTION OF THE PREFERRED EMBODIMENT

Figure 1:
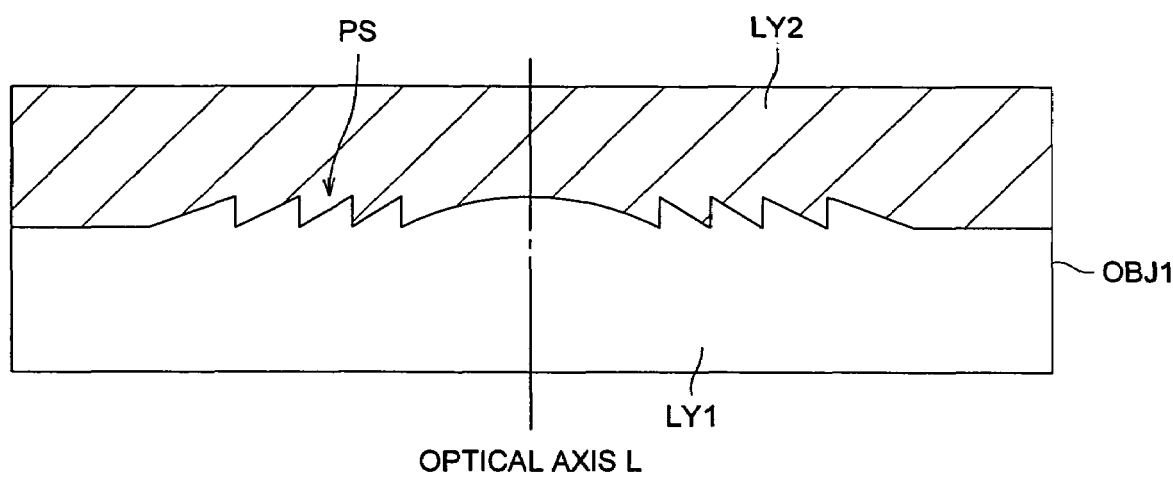
FIG. 1 illustrates a sectional view of an objective optical element OBJ1 having a phase structure.

Firstly, preferable embodiments to attain an objective of the present invention described above will be explained.

1. An optical pickup apparatus comprises a light source for emitting light rays having wavelength of λ1, a light converging optical system including an objective optical element and a photo detector, wherein the light converging optical system is arranged to focus light rays from the light source onto a surface of an information recording surface of a first optical information recording medium through a protective layer having thickness of t1 of the first optical information recording medium to record and or reproduce information onto or from the first optical information recording medium based on a signal from the photo detector receiving reflected light rays from the information recording surface, and to focus light rays from the light source onto a surface of an information recording surface of a second optical information recording medium through a protective layer having thickness of t2 (≠t1) of the second optical information recording medium to record and or reproduce information onto or from the second optical information recording medium based on a signal from the photo detector receiving reflected light rays from the information recording surface, wherein, the light converging optical system includes a switching device for switching a polarization direction of transmitting light rays, the switching device being placed between the light source and the objective optical element, and the objective optical element has a phase structure having functions not to change a transmission wavefront of incident light rays of ordinary polarized light rays or of extraordinary polarized light rays and having functions to change a transmission wavefront of incident light rays of extraordinary polarized light rays or of ordinary polarized light rays on an optical surface through which a parallel light flux is transmitted, the phase structure being made from a doubly refracting medium (birefringence medium) having an optical axis of a refractive index ellipsoid aligned in a single direction and having a refractive index of $n_0$ for ordinal light rays and a refractive index of $n_e$ (≠$n_0$) for extraordinary polarized light rays.

When recording and or reproducing information onto or from the first optical information recording medium, for example, the ordinary polarized light rays (or extraordinary polarized light rays) are arranged to be guide into the objective optical element by switching the polarization light ray direction of transmission light rays by the switching device. At this moment of time, it is possible to focus the light rays having passed through the objective optical element onto the information recording surface of the first optical information recording medium including a protective layer having thickness t1 to form an appropriate focal spot, since the transmission wavefront of the ordinary polarized light rays (or extraordinary polarized light rays) transmitted through the phase structure do not change. As a result, the convergent angle (or a divergent angle) does not change. Meanwhile, when recording and or reproducing information onto or from the second optical information recording medium, extraordinary polarized light rays (or the ordinary polarized light rays) are arranged to be guided to the objective optical element by switching the polarization light ray direction of transmission light rays by the switching device. At this moment of time, it is possible to focus the light rays having passed through the objective optical element onto the information recording surface of the second optical information recording medium including a protective layer having thickness t2 (≠t1) to form an appropriate focal spot, since the transmission wavefront of the extraordinary polarized light rays (or ordinary polarized light rays) transmitted through the phase structure change and as a result the convergent angle (or a divergent angle) change.

As the doubly refracting medium (birefringence medium), a liquid crystal material may be employed, more preferably, a liquid crystal material hardenable with ultraviolet rays may be employed. An example of the doubly refracting medium is disclosed in an Official gazette of Japanese Patent Application Open to Public Inspection (TOKUHYOU) No. JP2004-516594.

When, the numerical aperture NA1 of the first optical information recording medium is larger than the numerical aperture NA2 of the second optical information recording medium, it is possible to make the extraordinary polarized light rays (or ordinary polarized light rays) passing through the area being located outside of a distance being corresponding to the numerical aperture NA2 from the optical axis in the radius direction, into flare-light rays which do not contribute to form the light ray spot by switching the polarization direction of the transmission light rays. Accordingly, it is possible to provide the effect which functions as an aperture diaphragm.

In this specification, a phase structure includes a diffractive structure and a phase difference providing structure. A diffractive structure denotes a structure capable of generating diffracted light rays having a predetermined order of diffracted light rays corresponding to the transmission light rays. And the phase difference providing structure denotes a structure capable of generating phase contrast corresponding to the transmission light rays. In this specification, "Parallel light rays" include divergent light rays or converging light rays which fall within a range of angle between +−10 degree formed by the marginal light rays (most outer light rays) and the optical axis.

2. The optical pickup apparatus of item 1, wherein the switching device is arranged to change the polarization direction of the transmission light rays 90 degrees +−5 degrees by a liquid crystal. Japanese Patent Application Publication No. H10-268249 disclosed the switching device described above.

3. The optical pickup apparatus of item 1, wherein the switching device comprises a λ/2 wavelength plate and a mechanism for rotating the λ/2 wavelength plate 45 degrees +−5 degrees centering on an optical axis.

4. An optical pickup apparatus comprises a light source for emitting light rays having wavelength of λ1, a light converging optical system including an objective optical element and a photo detector, wherein the light converging optical system is arranged to focus light rays from the light source onto a surface of an information recording surface of a first optical information recording medium through a protective layer having thickness of t1 of the first optical information recording medium to record and or reproduce information onto or from the first optical information recording medium based on a signal from the photo detector receiving reflected light rays from the information recording surface, and to focus light rays from the light source onto a surface of an information recording surface of a second optical information recording medium through a protective layer having thickness of t2 (≠t1) of the second optical information recording medium to record and or reproduce information onto or from the second optical information recording medium based on a signal from the photo detector receiving reflected light rays from the information recording surface, wherein the objective optical element having a phase structure having functions not to change a transmission wavefront of incident light rays of ordinary polarized light rays or extraordinary polarized light rays and to change a transmission wavefront of incident light rays of extraordinarily polarized or ordinary polarized light rays on an optical surface through which a parallel light flux is transmitted, the phase structure being made from a birefringence medium having an optical axis of a refractive index ellipsoid aligned in a single direction, a refractive index of $n_0$ for ordinary light rays and a refractive index of $n_e$ ($\neq n_0$) for extraordinary polarized light rays, and the light source includes a first light source capable of emitting ordinary polarized light rays having the wavelength of λ1 against the phase structure and a second light source capable of emitting extraordinary polarized light rays having the wavelength of λ1 against the phase structure.

For example, when recording and or reproducing information onto the first optical information recording medium, ordinary polarized light rays (or extraordinary polarized light rays) having the wavelength of λ1 are emitted from the first light source and are arranged to be guided into the first objective optical element. At this moment of time, it is possible to focus the light rays having passed through the objective optical element onto the information recording surface of the first optical information recording medium including a protective layer having thickness of t1 to form an appropriate focal spot, since the transmission wavefront of the ordinary polarized light rays (or extraordinary polarized light rays) transmitted through the phase structure do not change and as a result the convergent angle (or a divergent angle) does not change. Meanwhile, when recording and or reproducing information onto or from the second optical information recording medium, extraordinary polarized light rays (or the ordinary polarized light rays) are emitted from the second light source having the wavelength of λ2 and are arranged to be guided into the objective optical element. At this moment of time, it is possible to focus the light rays having passed through the objective optical element onto the information recording surface of the second optical information recording medium including a protective layer having thickness of t2 (≠t1) to form an appropriate focal spot, since the transmission wavefront of the extraordinary polarized light rays (or ordinary polarized light rays) transmitted through the phase structure change and as a result the convergent angle (or a divergent angle) change.

5. The optical pickup apparatus as in any one of items 1-4, wherein the phase structure has a cross section having a concave/convexity shape of saw-tooth waveform and is filled with a medium having a refractive index $n_s$ being substantially equal to the refractive index of $n_0$ or $n_e$.

Figure 2:
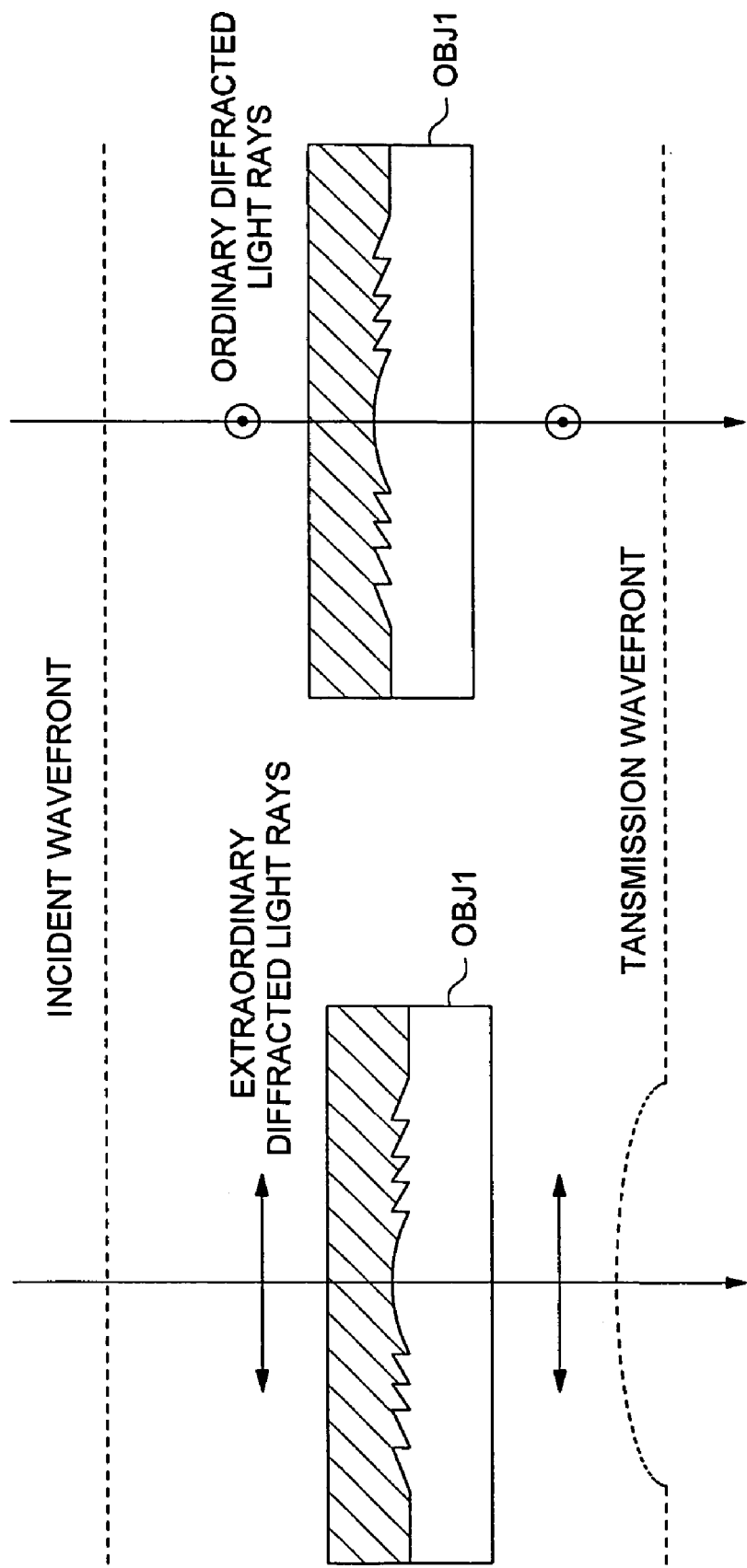
FIG. 2 illustrates a transmission wavefront occurred when passing different kinds of polarized light rays through the objective optical element OBJ1.

FIGS. 1-2 illustrate the cross sectional view of the objective optical element OBJ1 having a phase structure. The steps are exaggeratingly illustrated. The objective optical element OBJ1 functioning as an objective optical element combined with other positive lenses comprises a birefringence medium layer LY1 having ordinary light ray refractive index $n_o$ and extraordinary light ray refractive index $n_e$ ($n_o \neq n_e$). When the birefringence medium layer LY1 is made from optical crystals, the main optical axes are aligned in one direction and when the birefringence medium layer LY1 is made from a polymeric material, the molecular orientation axes are aligned in one direction. The cross section of the birefringence medium layer LY1 is formed in a saw-tooth shape and a phase structure PS having stepping structures having concave and convex shape formed in saw tooth shape being centering on an incident light ray axis. At least the concave portion of the concave and convex shape is filled with uniform refractive index transparent material LY2 having refractive indexes of ordinary light ray refractive index $n_o$ or extraordinary light ray refractive index $n_e$, being substantially equal to the refractive index $n_s$. The dual refractive medium LY1 is formed in a parallel flat panel as a whole.

When recording and or reproducing information onto or from the first optical information recording medium, the light source for emitting ordinary polarized light rays having wavelength λ1 is selected by the switching device which will be explained later. When the ordinary polarized light rays having wavelength λ1 are guided incident to the objective lens OBJ1, since the refractive indexes of birefringence medium layer LY1 and uniform refractive index transparent material LY2 are substantially equal, the transmission wavefront of the objective optical element OBJ1 does not change and maintains the original optical characteristic of the objective optical element as shown in FIG. 2(b).

Meanwhile, when recording and or reproducing information onto or from the second optical information recording medium, the light source for emitting the extraordinary polarized light rays having wavelength λ1 is selected by a switching device. When the extraordinary polarized light rays having wavelength λ1 are guided to the objective optical element OBJ1, since the refractive indexes of the birefringence medium layer LY1 and the uniform refractive index transparent material LY2 are different, the extraordinary polarized light rays having wavelength λ1 are diffracted by the concave and convex structure having a saw-tooth shape and the transmission wavefront changes corresponding to the concave and convex structure (refer to FIG. 2(a)). Consequently, the divergence angle or the convergent angle changes. Namely, the thickness of protective layer t1 of the first optical information recording medium and the protective layer t2 of the second optical information recording medium are different. Even though when the objective optical element is originally designed to regulate the spherical aberration against the thickness t1 of the protective layer of the first optical information recording medium, the spherical aberration against the thickness t2 of the protective layer of the second optical information recording medium can be regulated by using the phenomenon that the transmission wavefront is different when guiding extraordinary polarized light rays having wavelength λ1 to the objective optical element OBJ1.

6. The optical pickup apparatus as in any one of items 1-4, wherein the phase structure has a structure having a pattern shaped in a stepping shape in a cross section including an optical axis arranged in a concentric circle shape, and the pattern is filled with a medium having refractive index $n_o$ or refractive index $n_s$ being substantially equal to refractive index $n_e$.

Figure 3:
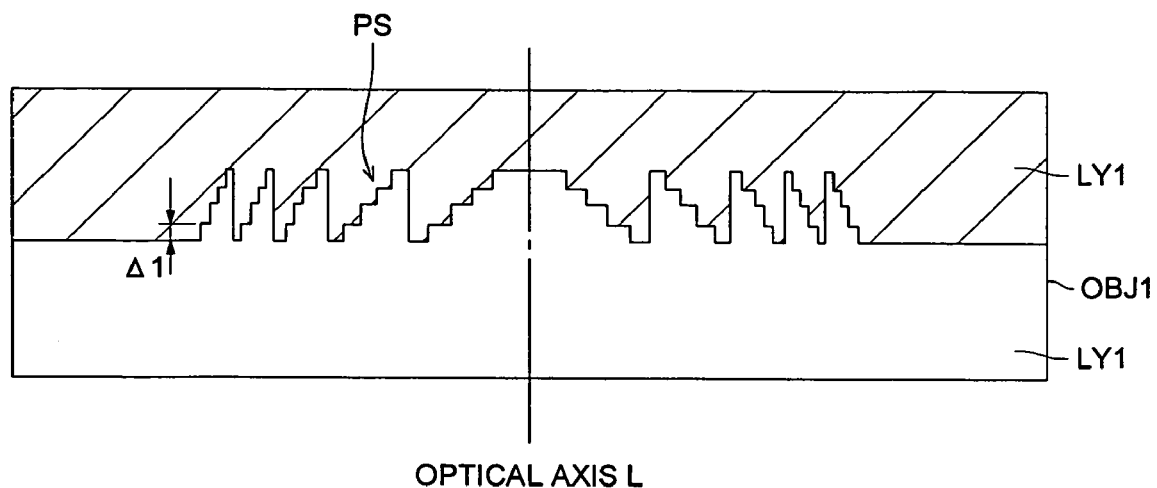
FIG. 3 illustrates another sectional view of the objective optical element OBJ1 having a phase structure.

FIG. 3 illustrate the cross sectional view of the objective optical element OBJ1 having a phase structure in another example. Steps are exaggeratingly illustrated. The objective optical element OBJ1 functioning as an objective optical element being combined with another positive lens comprises a birefringence medium layer LY1 having ordinary light ray refractive index $n_o$ and extraordinary light ray refractive index $n_e$ ($n_o \neq n_e$). When the birefringence medium layer LY1 is made from optical crystals, the main optical axes are aligned in one direction and when the birefringence medium layer LY1 is made from a polymeric material, the molecular orientation axes are aligned in one direction. The phase structure PS having a pattern shaped in a stepping shape in a cross section including an optical axis is arrayed in the birefringence medium layer LY1. The pattern shaped in the stepping shape is filled with a uniform refraction transparent material having refractive index $n_o$ or refractive index $n_s$ being substantially equal to refractive index $n_e$. The dual refractive medium LY1 is formed in a parallel flat panel as a whole.

When recording and or reproducing information onto or from the first optical information recording medium, the light source emitting ordinary polarized light rays having wavelength λ1 is selected by the switching device. When the ordinary polarized light rays having wavelength λ1 are guided to the objective lens OBJ1, since the refractive indexes of birefringence medium layer LY1 and uniform refractive index transparent material LY2 are substantially equal, the transmission wavefront of the objective optical element OBJ1 does not change and maintains the original optical characteristic of the objective optical element as shown in FIG. 2(b).

Meanwhile, when recording and or reproducing information onto or from the second optical information recording medium, the light source for emitting the extraordinary polarized light rays having wavelength λ1 is selected by a switching device. When the extraordinary polarized light rays having wavelength λ1 are guided incident to the objective optical element OBJ1, since the refractive indexes of the birefringence medium layer LY1 and the uniform refractive index transparent material LY2 are different, the transmission wavefront of the extraordinary polarized light rays having wavelength λ1 changes corresponding to the birefringence medium layer LY1 and the uniform refractive index transparent material LY2. Consequently, the divergence angle or the convergent angle changes. Namely, since the thickness of protective layer of t1 of the first optical information recording medium and the protective layer of t2 of the second optical information recording medium are different, even though when the objective optical element is originally designed to regulate the spherical aberration against the thickness t1 of the protective layer of the first optical information recording medium, the spherical aberration against the thickness t2 of the protective layer of the second optical information recording medium can be regulated by using the phenomenon that the transmission wavefront is different when guiding extraordinary polarized light rays having wavelength λ1 incident to the objective optical element OBJ1.

7. The optical pickup apparatus of as in any one of item 1-4, wherein the phase structure has a pattern shaped in a stepping structure in a cross section including an optical axis arranged in a concentric circle shape, and a phase difference between ordinary polarized light rays or extraordinary polarized light rays having wavelength λ1 generated by a concave structure and a convex structure of each step of the stepping shape is an integral multiplication of 2π.

Figure 4:
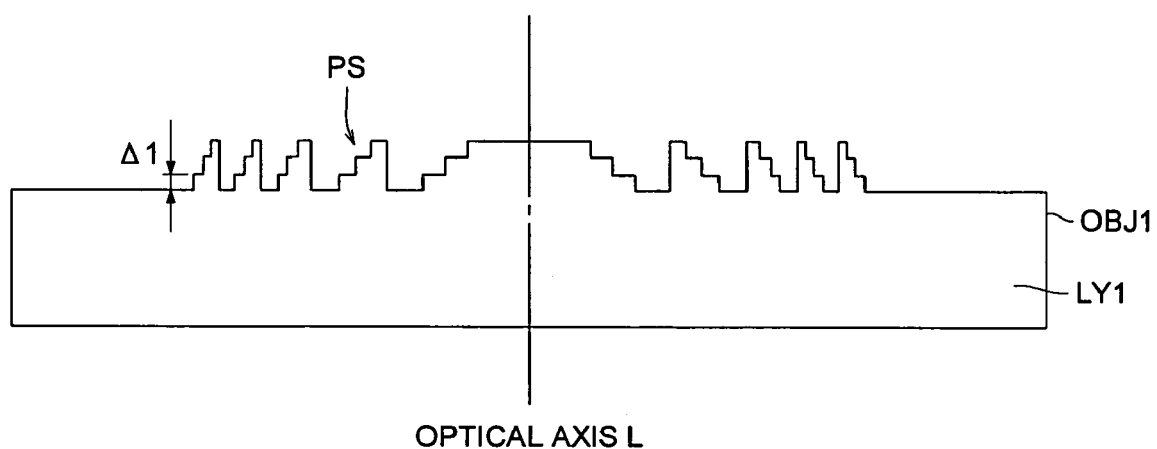
FIG. 4 illustrates another sectional view of the objective optical element OBJ1 having a phase structure.

FIG. 4 illustrate the cross sectional view of the objective optical element OBJ1 having a phase structure in another example. The steps are exaggeratingly illustrated. The objective optical element OBJ1 functioning as an objective optical element being combined with other positive lenses comprises a birefringence medium layer LY1 having ordinary light ray refractive index $n_o$ and extraordinary light ray refractive index $n_e$ ($n_o \neq n_e$). When the birefringence medium layer LY1 is made from optical crystals, the main optical axes are aligned in one direction and when the birefringence medium layer LY1 is made from a polymeric material, the molecular orientation axes are aligned in one direction. The phase structure PS having a pattern shaped in a stepping shape in a cross section including an optical axis is arrayed in the birefringence medium layer LY1. However, the pattern shaped in a stepping shape is not filled with a uniform refraction transparent material.

8. The optical pickup apparatus as in any one of items 1-4, wherein the phase structure has a pattern shaped in a stepping structure in a cross section including an optical axis arranged in a concentric circle shape, the pattern being filled with a material having refractive index $n_s$ ($n_s \neq n_o$, $n_s \neq n_e$), and a phase difference between polarized stationary light rays or extraordinary polarization light rays having wavelength λ1 generated by a concave structure and a convex structure of each step of the stepping shape is an integral multiplication of 2π.

9. The optical pickup apparatus as in any one of item 1-7, wherein the wavelength λ1=380 nm-450 nm. Consequently, BD and HD can be used as the first optical information recording medium and the second optical information recording medium.

In this specification, an objective optical element denotes an optical element having a focusing function, the optical element being placed at the most nearest position opposed to the optical information recording medium when the optical information recording medium is set on an optical pickup apparatus.

According to the present invention, it is possible to provide an optical pickup apparatus capable of appropriately recording and or reproducing information onto or from different kinds of optical information recording media by using light rays having the same wavelength.

Figure 5:
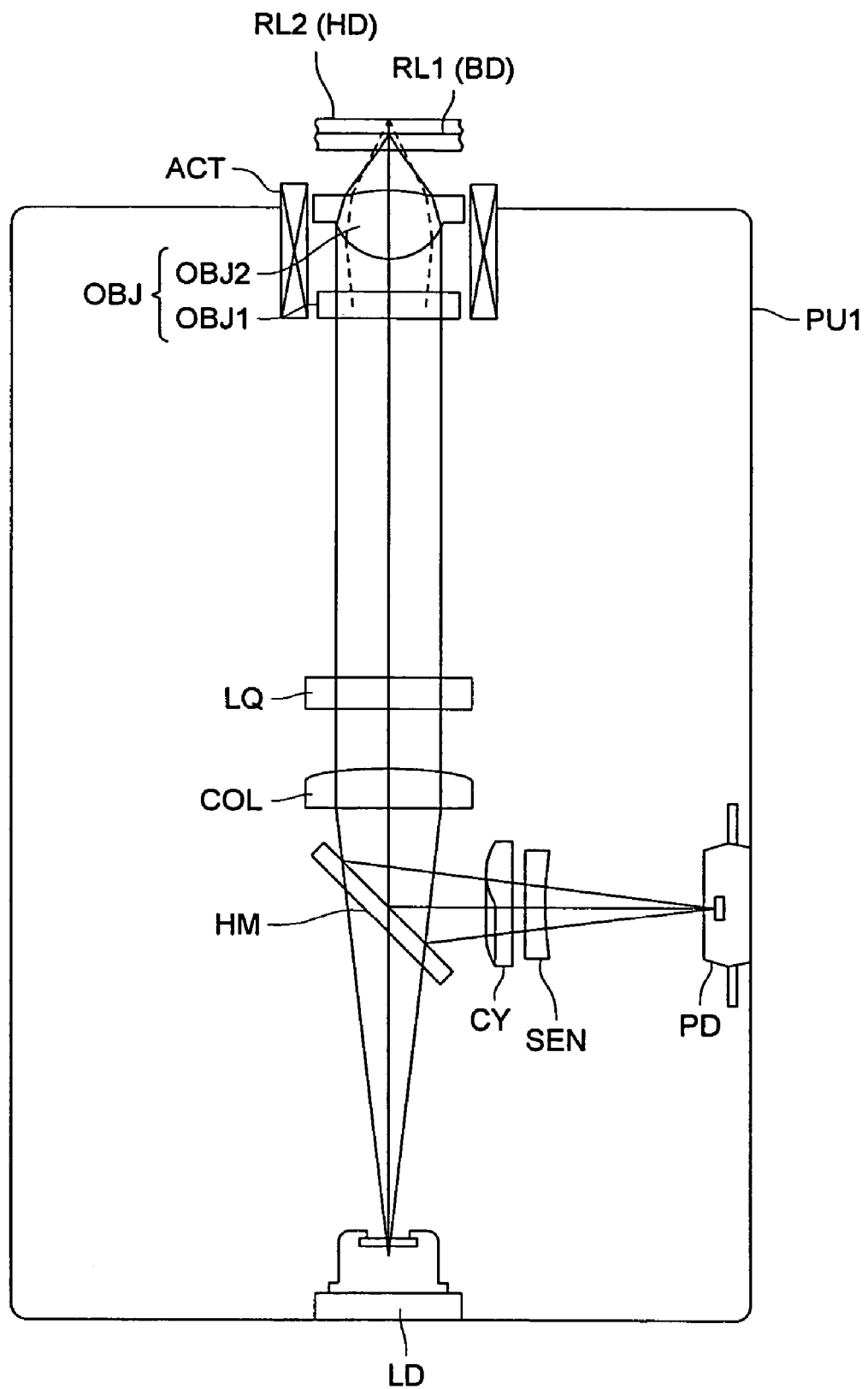
FIG. 5 illustrates a schematic diagram of an optical pickup apparatus of the first embodiment.

An embodiment of the present invention will be explained by using drawings below. FIG. 5 illustrates a schematic diagram of the embodiment of an optical pickup apparatus for the present invention capable of appropriately recording and or reproducing information on to different optical information recording media (they may be called an optical disc) such as BD or HD.

In this embodiment, as shown in FIGS. 1-3, a light converging optical system comprises a objective optical element (it is also called an objective lens) including an objective optical element OBJ1 having a phase structure and a second objective optical element Obj2 having a positive refractive index and a collimator lens COL. An optical pickup apparatus PU1 includes a semiconductor laser LD for emitting light rays having wavelength of λ1=380-450 nm, a liquid crystal element LQ as a switching member to change a polarization condition of a light flux, a photo detector PD, the objective optical element OBJ, an actuator ACT for driving the objective optical element OBJ, the liquid crystal element LQ, the collimator lens COL and a half mirror HM.

When recording and or reproducing information onto or from the first optical information recording medium BD, ordinary polarized light rays having wavelength λ1 are arranged to be emitted by passing through the liquid crystal element LQ. In the optical pickup apparatus PU1 shown in FIG. 5, light rays emitted the semiconductor laser LD pass through the liquid crystal element LQ and are formed into parallel light rays by a collimator lens COL after passing through the half mirror HM. Then the parallel light rays are ordinarily polarized by the liquid crystal element LQ and guided into the first objective lens OBJ1 of the objective optical element OBJ. However, since the transmission wavefront of the ordinary polarized light rays does not change while passing through the first object element OBJ 1, the polarized ordinary light rays are guided into the second objective element OBJ2 in a parallel light ray state and focused onto the information recording surface RL1 (the thickness of the protective layer t1=0.0875 mm).

Reflected light rays modulated by the information pits of an information recording surface RL1 pass back through the objective optical element OBJ, the liquid crystal element LQ and the collimator lens COL and are reflected by the half mirror. The reflected light rays are arranged to focus on a photo detector PD through a cylindrical lens CY. Information recorded on BD can be obtained by using the output signal from the photo detector PD.

Focal point detection and track detection are conducted by detecting a light ray amount change resulting from a shape change and a position change of the light ray spot on the photo detector PD. An actuator ACT moves the objective optical element OBJ in an optical axis direction and a direction orthogonal to the optical axis based on the detected signal.

When recording and or reproducing information onto or from the second optical information recording medium HD, extraordinary polarized light rays having wavelength λ1 are arranged to be emitted by passing through the liquid crystal element LQ. In the optical pickup apparatus PU1 shown in FIG. 5, light rays emitted from the semiconductor laser LD pass the half mirror and are formed into parallel light rays by the collimator lens COL. Then the parallel light rays are extraordinarily polarized by the liquid crystal element LQ and guided into the first objective lens OBJ1 of the objective optical element OBJ. However, since the transmission wavefront of the extraordinary polarized light rays change while passing through the first object element OBJ 1, light rays adjacent to the optical axis becomes to the first order diffractive light rays, the light rays passing through the area which height from optical axis left more than a distance corresponding to numerical aperture 0.65 are arrange to become flare light rays. Since the first diffractive light rays guided into the second objective element OBJ2 are focused onto the information recording surface RL2 (protective layer thickness t2=0.6 mm) of HD, even though the protective layer thickness t2 is different from the protective layer thickness t1 of BD, the spherical aberration caused by the differences of the protective layer thickness is appropriately regulated.

Reflected light rays modulated by the information pits of an information recording surface RL1 pass back through the objective optical element OBJ, the liquid crystal element LQ and the collimator lens COL and are reflected by the half mirror HM. The reflected light rays are arranged to focus on a photo detector PD through a cylindrical lens CY. Information recorded on HD can be obtained by using the output signal from the photo detector PD.

Focal point detection and track detection are conducted by detecting a light ray amount change resulting from a shape change and a position change of the light ray spot on the photo detector PD. An actuator ACT moves the objective optical element OBJ in an optical axis direction and a direction orthogonal to the optical axis based on the detected signal.

Figure 6:
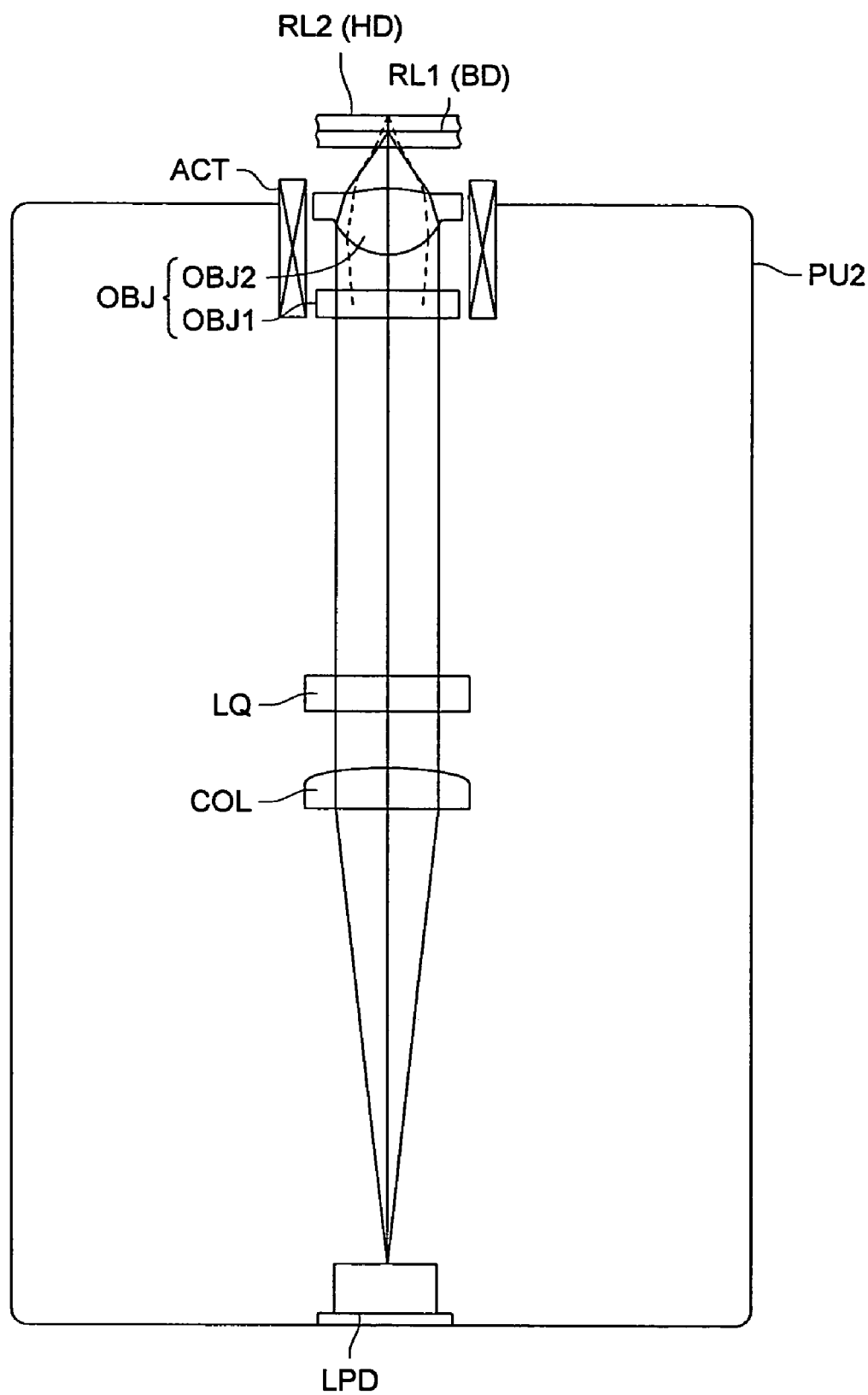
FIG. 6 illustrates a schematic diagram of an optical pickup apparatus of the second embodiment.

FIG. 6 illustrates a schematic diagram of the embodiment of an optical pickup apparatus for the present invention capable of appropriately recording and or reproducing information onto different optical information recording media (they may be called an optical disc) such as BD or HD.

In this embodiment, as shown in FIGS. 1-3, a light converging optical system comprises an objective optical element (it is called a objective lens) including an objective optical element OBJ1 having a phase structure and a second objective optical element Obj2 having a positive refractive index and a collimator lens COL. An optical pickup apparatus PU2 includes a laser sensor unit having a semiconductor laser LD emitting light rays having wavelength λ1=380-450 nm, a liquid crystal element LQ as a switching device and a photo detector PD, an objective optical element OBJ, an actuator ACT for driving the objective optical element OBJ, a liquid crystal element LQ and a collimator lens COL.

When recording and or reproducing information onto or from the first optical information recording medium BD, ordinary polarized light rays having wavelength λ1 are arranged to be emitted by passing through the liquid crystal element LQ. In the optical pickup apparatus PU1 shown in FIG. 6, light rays emitted from the semiconductor laser LD pass through the liquid crystal element LQ and are formed into parallel light rays. Then the parallel light rays are ordinarily polarized by the liquid crystal element LQ and guided into the first objective lens OBJ1 of the objective optical element OBJ. However, since the transmission wavefront of the ordinary polarized light rays does not change while passing through the first object element OBJ 1, the polarized ordinary light rays are guided into the second objective element OBJ2 in a parallel light ray state and focused onto the information recording surface RL1 (the thickness of the protective layer t1=0.0875 mm).

Reflected light rays modulated by the information pits of an information recording surface RL1 pass back through the objective optical element OBJ, the liquid crystal element LQ and the collimator lens COL. The reflected light rays are arranged to focus onto the receiving surface of the photo detector in the laser sensor unit LPD. Information recorded on BD can be obtained by using the output signal from the photo detector PD.

Focal point detection and track detection are conducted by detecting a light ray amount change resulting from a shape change and a position change of the light ray spot on the photo detector. An actuator ACT moves the objective optical element OBJ in an optical axis direction and a direction orthogonal to the optical axis based on the detected signal.

When recording and or reproducing information onto or from the second optical information recording medium HD, extraordinary polarized light rays having wavelength λ1 are arranged to be emitted by passing through the liquid crystal element LQ. In the optical pickup apparatus PU1 shown in FIG. 6, light rays emitted from the semiconductor laser LD are formed into parallel light rays by the collimator lens COL. Then the parallel light rays are extraordinarily polarized by the liquid crystal element LQ and are guided into the first objective lens OBJ1 of the objective optical element OBJ. Since the transmission wavefront of the extraordinary polarized light rays change while passing through the first object element OBJ1, light rays adjacent to the optical axis becomes to the first order diffractive light rays. However the light rays passing through the area which height from optical axis left more than a distance corresponding to numerical aperture 0.65 are arrange to become flare light rays. Since the first order diffractive light rays guided into the second objective element OBJ2 are focused onto the information recording surface RL2 (protective layer thickness t2=0.6 mm) of HD, even though the protective layer thickness t2 is different from the protective layer thickness t1 of BD, the spherical aberration caused by the differences of the protective layer thickness is appropriately regulated.

Reflected light rays modulated by the information pits of an information recording surface RL1 pass back through the objective optical element OBJ, the liquid crystal element LQ and the collimator lens COL. Then the reflected light rays are arranged to focus onto a light ray receiving surface of a photo detector in the laser sensor unit LPD. Information recorded on HD can be obtained by using the output signal from the photo detector PD.

Focal point detection and track detection are conducted by detecting a light ray amount change resulting from a shape change and a position change of the light ray spot on the photo detector PD. An actuator ACT moves the objective optical element OBJ in an optical axis direction and a direction orthogonal to the optical axis based on the detected signal.

Figure 7:
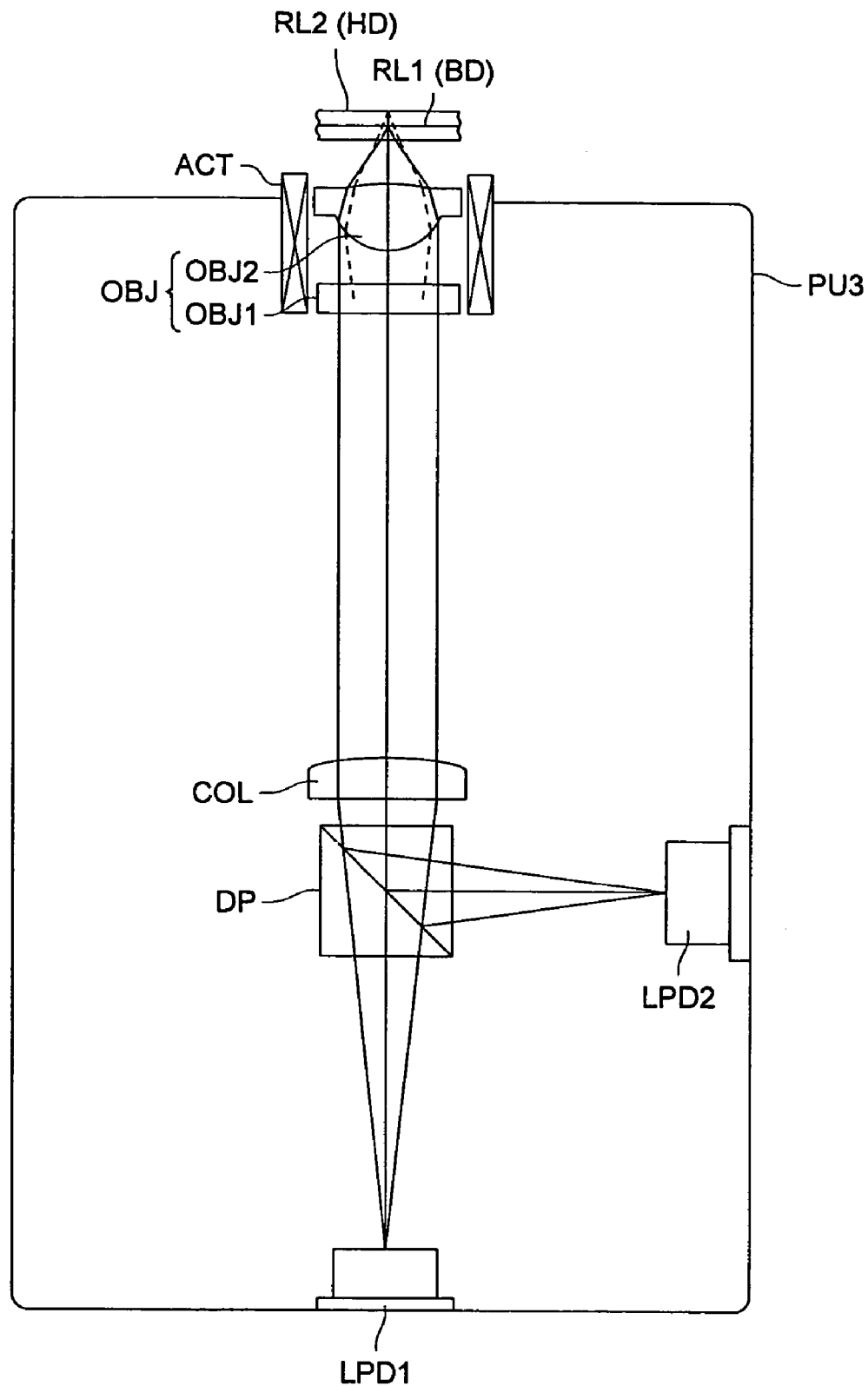
FIG. 7 illustrates a schematic diagram of an optical pickup apparatus of the third embodiment.

FIG. 7 illustrates a schematic diagram of the embodiment of an optical pickup apparatus for the present invention capable of appropriately recording and or reproducing information onto different optical information recording media (they may be called an optical disc) such as BD or HD.

In this embodiment, as shown in FIGS. 1-3, an optical system (it is called a objective lens) comprises a objective optical element including an objective optical element OBJ1 having a phase structure and a second objective optical element OBJ2 having a positive refractive index, a liquid crystal element LQ as a switching device and a collimator lens COL. An optical pickup apparatus PU3 includes a laser sensor unit having a semiconductor laser LD (a first light source) for emitting light rays having wavelength $\lambda1$=380-450 nm (P polarized light rays), a second laser sensor unit LPD2 including a semiconductor laser (a second light source) for emitting light rays having wavelength $\lambda1$=380-450 nm (S polarized light rays orthogonal to P polarized light rays) as a light source and a photo detector PD, an objective optical element OBJ, an actuator ACT for driving the objective optical element OBJ, a liquid crystal element LQ and a collimator lens COL.

When recording and or reproducing information onto the first optical information recording medium BD, in the optical pickup apparatus PU3 shown in FIG. 7, light rays emitted from the semiconductor laser in the first laser sensor unit LPD1 pass through the polarized ray splitter DP and guided into the first objective optical element OBJ1 of the objective optical element OBJ after being shaped into parallel light rays by passing through the collimator lens COL. Since the transmission wavefront of the ordinary polarized light rays does not change while passing through the first object element OBJ1, the ordinary polarized light rays are guided into the second objective element OBJ2 in a parallel light ray state and focused onto the information recording surface RL1 (the thickness of the protective layer t1=0.0875 mm) of BD.

Reflected light rays modulated by the information pits of an information recording surface RL1 pass back through the objective optical element OBJ, the collimator lens COL and a polarized ray splitter. The reflected light rays are arranged to focus onto the receiving surface of photo detector in the first laser unit LPD1. Information recorded on BD can be obtained by using the output signal from the photo detector PD.

Focal point detection and track detection are conducted by detecting a light ray amount change resulting from a shape change and a position change of the light ray spot on the photo detector PD. An actuator ACT moves the objective optical element OBJ in an optical axis direction and a direction orthogonal to the optical axis based on the detected signal.

When recording and or reproducing information onto or from the second optical information recording medium HD, in the optical pickup apparatus shown in FIG. 7, the light rays emitted from the semiconductor laser in the second laser sensor unit LPD2 are reflected by the polarized ray splitter DP and are guided into the first objective optical element OBJ1 of the objective optical element OBJ after being shaped into parallel light rays by the collimator lens COL. Since the wavefront of extraordinary polarized light rays (S polarized light rays) changes while passing through the first objective optical element OBJ1, the light rays adjacent to the optical axis become the first order diffracted light rays. However the light rays passing through the area which height from optical axis left more than a distance corresponding to numerical aperture 0.65 are arrange to become flare light rays. Since the first order diffractive light rays guided into the second objective element OBJ2 are focused onto the information recording surface RL2 (protective layer thickness t2=0.6 mm) of BD, even though the protective layer thickness t2 is different from the protective layer thickness t1 of BD, the spherical aberration caused by the differences between the protective layer thickness is appropriately regulated.

Reflected light rays modulated by the information pits of an information recording surface RL2 pass back through the objective optical element OBJ and the collimator lens COL, and are reflected by a polarized ray splitter DP. The reflected light rays are arranged to focus onto the receiving surface of photo detector in the second laser unit LPD2. Information recorded on HD can be obtained by using the output signal from the photo detector PD.

Focal point detection and track detection are conducted by detecting a light ray amount change resulting from a shape change and a position change of the light ray spot on the photo detector PD. An actuator ACT moves the objective optical element OBJ in an optical axis direction and a direction orthogonal to the optical axis based on the detected signal.

Figure 8:
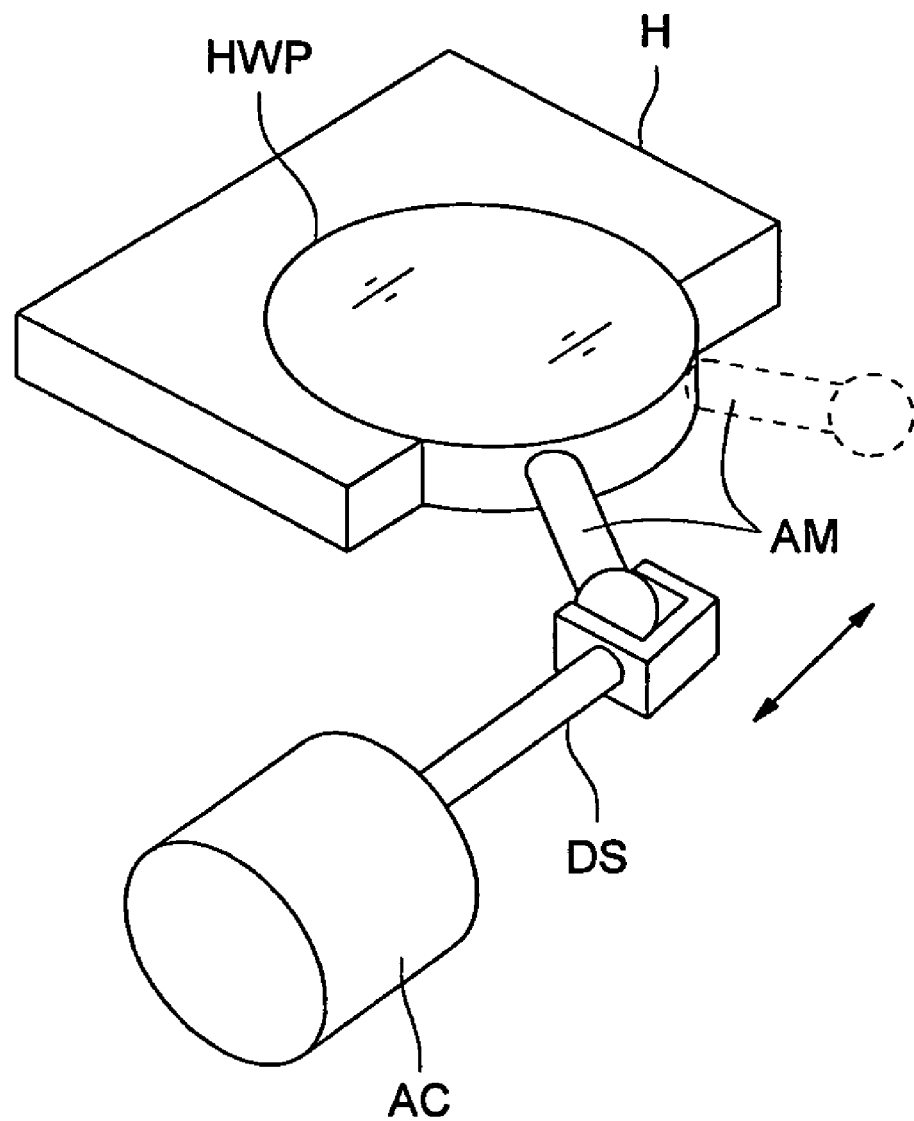
FIG. 8 illustrates a perspective view of an example of a switching device which can be used instead of a liquid crystal element LQ in the embodiments shown in FIGS. 5 and 6.

FIG. 8 illustrates a perspective view of an example of the switching device which can be used instead of the liquid crystal element LQ in the embodiments shown in FIGS. 5 and 6. In FIG. 8, a $\lambda/2$ plate HWP formed in a discus shape is placed so that it freely rotates in a cutout of a housing H. An arm AM fixed onto the circumference of the $\lambda/2$ plate HWP extends in a radius direction from the cutout of the housing H. A drive shaft DS is connected with the top end of the arm AM. The drive shaft DS is arranged to be moved by the actuator AC in a shaft line.

In the state that the actuator AC has pulled the drive shaft DS in, the arm AM positions as shown in a solid line in FIG. 8. Meanwhile, in the state that the actuator AC has pushed the drive shaft DS out, the arm positions as shown in a doted line as shown in FIG. 8. Accordingly, the $\lambda/2$ plate HWP positions where the $\lambda/2$ plate HWP rotates 45°.

When applying the switching device to the optical pickup apparatus shown in FIGS. 6 and 7, and recording and or reproducing information onto or from BD, for example, pulling the drive shaft DS in by the actuator AC rotates the $\lambda/2$ plate HWP at a predetermined angle and light rays passed through the $\lambda/2$ plate HWP become ordinary polarized light rays. Meanwhile pushing the drive shaft DS out by the actuator AC rotates the λ/2 plate HWP a predetermined angle +45° and light rays passed through 45° become extraordinary polarized light rays. Consequently, it is possible to realize the same effects described above by applying the switching device instead of the liquid crystal element LQ.

In these embodiments described above, the phase structure provided in the objective optical element does not change the transmission wavefront when ordinary polarized light rays passing-through the objective optical element but changes the transmission wavefront when extraordinary polarized light rays passing through the objective optical element. However, it is also possible that the phase structure provided in the objective optical element does not change the transmission wavefront when extraordinary polarized light rays passing through the objective optical element but changes the transmission wavefront when ordinary polarized light rays passing through the objective optical element. Further, in this invention, it is possible to provide an optical pickup apparatus having triplex compatibility across BD, HD or quadruple compatibility across DVD or BD, HD, DVD and CD by applying a light source including light rays having wavelength λ2 (600 nm<λ2<700 nm) and λ3 (700 nm<λ2<800 nm) in addition to the light source emitting light rays having a wavelength of λ1 and an focusing optical system.

Preferable embodiments of the present invention will be described below. Embodiment 1 is a preferable embodiment suitable for an optical pickup apparatus shown in FIG. 6. Table 1 shows lens data. From now on, (including lens data in tables below), the power of 10, for example, 2.5×10−3 will be expressed as 2.5E−3.

TABLE 1

[Optical specifications]

| | BD | HD |
|---|---|---|
| Focal length (mm) | 2.200 | 2.197 |
| Numerical aperture | 0.85 | 0.65 |
| Wavelength (nm) | 408 | 408 |
| Diffraction direction corresponding to birefringence phase structure | Ordinarily diffracted light rays | Extra ordinarily diffracted light rays |
| Image magnification | 0 | 0 |

[Paraxial data]

| Surface number | r(mm) | d(mm) | $n_{408}$ | $n_o$ | $n_e$ | Remarks |
|---|---|---|---|---|---|---|
| OBJ | | Indefinite | | | | Light source |
| 1 (Diaphragm diameter) | | 0 (φ3.74 mm) | | | | Diaphragm |
| 2 | Indefinite | 0.500 | 1.53000 | — | — | |
| 3 | Indefinite | 0.500 | — | 1.53000 | 1.61000 | Phase structure |
| 4 | Indefinite | 0.100 | 1.56652 | | | |
| 5 | 1.46123 | 2.620 | | — | — | |
| 6 | −2.98092 | d1 | 1.62110 | | | |
| 7 | Indefinite | d2 | | — | — | Protective layer |
| 8 | Indefinite | | | | | |

| | BD | HD |
|---|---|---|
| d1 | 0.71862 | 0.40223 |
| d2 | 0.0875 | 0.6000 |

[An aspherical coefficient]

| | 5th surface | 6th surface |
|---|---|---|
| κ | −6.3859E−01 | −28.4399679 |
| A4 | 6.7764E−03 | 1.2550E−01 |
| A6 | −5.4011E−04 | −1.2189E−01 |
| A8 | 2.4371E−03 | 7.1513E−02 |
| A10 | −1.3270E−03 | −2.7970E−02 |
| A12 | 2.5676E−04 | 6.4203E−03 |
| A14 | 2.2698E−04 | −6.5216E−04 |
| A16 | −1.6467E−04 | 0 |
| A18 | 4.3311E−05 | 0 |
| A20 | −4.3257E−06 | 0 |

[Diffraction surface coefficient]

3rd surface (0 ≦ h ≦ 1.43 mm)

| | |
|---|---|
| $M_{BD}/M_{HD}$ | 0/1 |
| λB | 408 nm |
| B2 | 0 |

TABLE 1-continued

| | |
|---|---|
| B4 | −9.5421E−04 |
| B6 | −3.0161E−04 |
| B8 | 4.9974E−05 |
| B10 | −1.4539E−05 |

There is no phase structure in an area of h > 1.43 mm.

The optical surface of the objective optical lens is formed by an axial symmetry aspherical surface defined by substituting the coefficient shown in Table 1 into the Formula 1.

Formula 1

An aspherical form formula $$X(h) = \frac{(h^2/R)}{1 + \sqrt{1 - (1+\kappa)(h/R)^2}} + \sum_{i=0}^{9} A_{2i} h^{2i}$$

Where, X(h) is an axis in the optical axis direction (the traveling direction of light rays is defined as a positive direction), k is a constant of corn, A2i is an aspherical coefficient and h is a height from the optical axis.

The optical path length given to each wavelength of the light rays is calculated by substituting the coefficient shown in Table 1 into following optical path function defined by formula 2.

Formula 2

An optical path difference function.

$$\Phi(h) = \sum_{i=0}^{5} B_{2i} h^{2i}$$

Where, $B_{2i}$ is a coefficient of the optical path function.

An embodiment of the present invention will be described by referring to FIG. 3. A phase structure PS has functions not to diffract "ordinarily diffracted light rays" having wavelength of λ1 but diffract "extraordinarily diffracted light rays". The cross-sectional shape including the optical axis of the phase structure PS is a stepping shape and the stepping shaped pattern is arrayed on a concentric circle. The phase structure has predetermined number of steps (in this embodiment, the predetermined number of step is five). Each step is shifted a length corresponding to the height of the step in the step structure (in this embodiment, it has a four step structure).

Each height of the step Δ1 in a stepping structure is defined by the formula of Δ1=λ1/($n_e$−$n_o$)=1.02 μm. Where $n_o$ is an ordinary refractive index of a birefringence medium layer LY1 with light rays having wavelength λ1 and $n_e$ is a extraordinary light ray refractive index of a birefringence medium layer LY1 with light rays having wavelength λ1.

When ordinarily diffracted light rays having wavelength λ1 is guided into the phase structure, the ordinarily diffracted light rays transmit the phase structure without any action from the phase structure since the refractive indexes of the birefringence medium layer LY1 and the uniform refractive index transparent medium LY2 are substantially equal. Meanwhile, the optical path difference caused by the height of the step Δ1 for extraordinarily diffracted light rays having wavelength λ1 is 0.2×λ1, and the phase of the extraordinarily diffracted light rays having wavelength λ1 is shifted by about 2π/5. Since single saw-tooth shape is divided into five, one saw-tooth shape makes the phase shift of 5×2π/5=2π, first order diffracted light rays are generated. The phase structure PS is designed to focus the first diffracted light rays onto the recording surface RL2 of HD.

As described above, the phase structure PS corrects spherical aberration caused by the protective layer thickness differences between BD and HD by selectively diffracting extraordinarily diffracted light rays having wavelength of λ1. Further, since the phase structure PS is provided only in a NA area used for HD (0≦h≦1.43 mm), light rays passing through the outside of the phase structure do not focus onto the information recording surface of RL2. As a result, it works to regulate the aperture of HD. The diffractive efficiency of zero-order diffractive light rays (transmission light rays) of the ordinarily diffracted light rays having wavelength λ1 generated by the phase structure is 100%. The diffractive efficiency of the first order diffractive light rays of the extraordinarily diffractive light rays having wavelength λ1 is 87.5%. As explained above, it is possible to obtain high diffractive efficiencies for both BD and HD.

An embodiment 2 is a preferable embodiment for the optical pickup of item 5. Table 2 shows lens data.

TABLE 2

| | [Optical specifications] | |
|---|---|---|
| | BD | HD |
| Focal length (mm) | 2.200 | 2.197 |
| Numerical aperture | 0.85 | 0.65 |
| Wavelength (nm) | 408 | 408 |
| Diffraction direction corresponding to birefringence phase structure | Ordinarily diffracted light rays | Extraordinarily diffracted light rays |
| Image magnification | 0 | 0 |

TABLE 2-continued

[Paraxial data]

| Surface number | r(mm) | d(mm) | $n_{408}$ | $n_o$ | $n_e$ | Remarks |
|---|---|---|---|---|---|---|
| OBJ | | Indefinite | | | | Light source |
| 1 (Diaphragm diameter) | | 0 (φ3.74 mm) | | | | Diaphragm |
| 2 | Indefinite | 0.500 | 1.53000 | — | — | |
| 3 | Indefinite | 0.500 | — | 1.53000 | 1.61000 | Phase structure |
| 4 | Indefinite | 0.100 | | | | |
| 5 | 1.46123 | 2.620 | 1.56652 | | | |
| 6 | −2.98092 | d1 | | | | |
| 7 | Indefinite | d2 | 1.62110 | — | — | Protective layer |
| 8 | Indefinite | | | | | |

| | BD | HD |
|---|---|---|
| d1 | 0.71862 | 0.40223 |
| d2 | 0.0875 | 0.6000 |

[An aspherical coefficient]

| | 5th surface | 6th surface |
|---|---|---|
| κ | −6.3859E−01 | −28.4399679 |
| A4 | 6.7764E−03 | 1.2550E−01 |
| A6 | −5.4011E−04 | −1.2189E−01 |
| A8 | 2.4371E−03 | 7.1513E−02 |
| A10 | −1.3270E−03 | −2.7970E−02 |
| A12 | 2.5676E−04 | 6.4203E−03 |
| A14 | 2.2698E−04 | −6.5216E−04 |
| A16 | −1.6467E−04 | 0 |
| A18 | 4.3311E−05 | 0 |
| A20 | −4.3257E−06 | 0 |

[Diffraction surface coefficient]

| | 3rd surface (0 ≦ h ≦ 1.43 mm) |
|---|---|
| $M_{BD}/M_{HD}$ | 0/1 |
| λB | 408 nm |
| B2 | 0 |
| B4 | −9.5421E−04 |
| B6 | −3.0161E−04 |
| B8 | 4.9974E−05 |
| B10 | −1.4539E−05 |

There is no phase structure in an area of h > 1.43 mm.

An embodiment will be described by using FIG. 1. The phase structure PS has a function not to diffract "ordinarily diffracted light rays having wavelength λ1" but to diffract "extraordinarily diffracted light rays having wavelength λ1". The cross-sectional shape including the optical axis of the phase structure PS is a saw-tooth shape and the saw-tooth pattern is arrayed on a concentric circle.

When ordinary diffracted light rays having wavelength λ1 is guided into the phase structure, the ordinary diffracted light rays transmit the phase structure without any action from the phase structure since the refractive indexes of the birefringence medium layer LY1 and the uniform refractive index transparent medium LY2 are substantially equal. Meanwhile, the phase structure PS is designed to generate the first order diffracted light rays when the ordinary diffracted light rays having wavelength λ1 is guided into the phase structure. The phase structure PS is designed to focus the first order diffracted light rays on the information recording surface RL2.

As described above, the phase structure PS corrects spherical aberration caused by the protective layer thickness differences between BD and HD by selectively diffracting extraordinarily diffracted light rays having wavelength of λ1. Further, since the phase structure PS is placed only in a NA area used for HD (0≦h≦1.43 mm), light rays passing through the outside of the phase structure do not focus onto the information recording surface of RL2. As a result, it works to regulate the aperture of HD. The diffractive efficiency of zero-order diffractive light rays (transmission light rays) of the ordinarily diffracted light rays having wavelength λ1 generated by the phase structure is 100%. The diffractive efficiency of the first order diffractive light rays of the extraordinarily diffractive light rays having wavelength λ1 is 87.5%. As described above, it is possible to obtain high diffractive efficiencies for both BD and HD.

An embodiment 3 is a preferable embodiment for the optical pickup of item 6. Table 3 shows lens data.

TABLE 3

[Optical specifications]

|  | BD | HD |
|---|---|---|
| Focal length (mm) | 2.200 | 2.197 |
| Numerical aperture | 0.85 | 0.65 |
| Wavelength (nm) | 408 | 408 |
| Diffraction direction corresponding to birefringence phase structure | Extraordinarily diffracted light rays | Ordinarily diffracted light rays |
| Image magnification | 0 | 0 |

[Paraxial data]

| Surface number | r(mm) | d(mm) | $n_{408}$ | $n_o$ | $n_e$ | Remarks |
|---|---|---|---|---|---|---|
| OBJ | | Indefinite | | | | Light source |
| 1 (Diaphragm diameter) | | 0 (φ3.74 mm) | | | | Diaphragm |
| 2 | Indefinite | 0.500 | — | 1.53000 | 1.61000 | Phase structure |
| 3 | Indefinite | 0.100 | | | | |
| 4 | 1.4914 | 2.620 | 1.56652 | — | — | |
| 5 | −3.35718 | d1 | | | | |
| 6 | Indefinite | d2 | 1.62110 | — | — | Protective layer |
| 7 | Indefinite | | | | | |

|  | BD | HD |
|---|---|---|
| d1 | 0.71862 | 0.40223 |
| d2 | 0.0875 | 0.6000 |

[An asperical coefficient]

|  | 4th surface | 5th surface |
|---|---|---|
| κ | −6.3859E−01 | −28.4399679 |
| A4 | 6.7764E−03 | 1.2550E−01 |
| A6 | −5.4011E−04 | −1.2189E−01 |
| A8 | 2.4371E−03 | 7.1513E−02 |
| A10 | −1.3270E−03 | −2.7970E−02 |
| A12 | 2.5676E−04 | 6.4203E−03 |
| A14 | 2.2698E−04 | −6.5216E−04 |
| A16 | −1.6467E−04 | 0 |
| A18 | 4.3311E−05 | 0 |
| A20 | −4.3257E−06 | 0 |

[Diffraction surface coefficient]

2nd surface (0 ≦ h ≦ 1.43 mm)

| $M_{BD}/M_{HD}$ | 0/−1 |
|---|---|
| 1B | 408 nm |
| B2 | 0 |
| B4 | 9.5443E−04 |
| B6 | 3.0111E−04 |
| B8 | −4.9794E−05 |
| B10 | 1.4450E−05 |

There is no phase structure in an area of h > 1.43 mm.

An embodiment of the present invention will be described by referring to FIG. 4. A phase structure PS has functions not to diffract "extraordinarily diffracted light rays having wavelength of λ1 but to diffract "ordinarily diffracted light rays". The cross-sectional shape including the optical axis of the phase structure PS is a stepping shape and the stepping shaped pattern is arrayed on a concentric circle. The phase structure has predetermined number of steps (in this embodiment, the predetermined number of step is four). Each step is shifted a length corresponding to the height of the step in the step structure (in this embodiment, it has a three step structure). Each height of the step Δ1 in a stepping structure is defined by the formula of Δ1=2×λ1/($n_e$−1)=1.34 μm.

Where $n_e$ is an extraordinary refractive index of a birefringence medium layer LY1 with light rays having wavelength λ1.

When "the extraordinarily diffracted light rays having wavelength of λ1" is guided to the phase structure, since the optical path difference given to "the extraordinarily diffracted light rays having wavelength λ1" is 2×λ1, "the extraordinarily diffracted light rays" pass through the phase structure without receiving any action from the phase structure. Meanwhile, the optical path difference generated by the height of the step Δ1 for ordinarily diffracted light rays having wavelength λ1 is 1.74×λ1, and the phase of "the ordinarily diffracted light rays having wavelength λ1" is shifted by about −2π/4. Since single saw-tooth shape is divided into four, one saw-tooth shape makes the phase shift of 4×(−2π/4)=−2π, minus first order diffracted light rays are generated. The phase structure PS is designed to focus the minus first order diffracted light rays onto the recording surface RL2 of HD.

As described above, the phase structure PS corrects spherical aberration caused by the protective layer thickness differences between BD and HD by selectively diffracting ordinarily diffracted light rays having wavelength of λ1. Further, since the phase structure PS is provided only in a NA area used for HD (0≦h≦1.43 mm), light rays passing through the outside of the phase structure do not focus onto the information recording surface of RL2. As a result, it works to regulate the aperture of HD. The diffractive efficiency of zero-order diffractive light rays (transmission light rays) of the extraordinarily diffracted light rays having wavelength λ1 generated by the phase structure is 100%. The diffractive efficiency of the minus first order diffractive light rays of the ordinarily diffractive light rays having wavelength λ1 is 80.5%. As described above, it is possible to obtain high diffractive efficiencies for both BD and HD.

What is claimed is:

1. An optical pickup apparatus, comprising:
   (1) a light source device to emit selectively an ordinary polarized light ray and an extraordinary polarized light ray by controlling a polarization condition of a light flux having a wavelength of λ1;
   (2) a light converging optical system having an objective lens and for converging a light flux having the wavelength of λ1 onto an information recording surface of a first optical information recording medium through a protective layer having a thickness of t1 or onto an information recording surface of a second optical information recording medium through a protective layer having a thickness of t2 different from t1 (t1≠t2); and
   (3) an optical detector for receiving a reflected light from the information recording surface of the first optical information recording medium and the second information recording medium and for outputting a signal;
   wherein the objective lens has a phase structure on one of optical surfaces through which a parallel light flux is transmitted, the phase structure is made of a doubly refracting medium in which an ordinary ray refractive index $n_o$ for the ordinary polarized light ray is different from an extraordinary ray refractive index $n_e$ ($n_e \neq n_o$) for the extraordinary polarized light ray and an optical axis of a refractive index ellipsoid is aligned in a single direction so that the phase structure has a function for not changing a transmitted wavefront of an incident light ray being one of the ordinary polarized light ray and the extraordinary polarized light ray and for changing a transmitted wavefront of an incident light ray being the other one of the ordinary polarized light ray and the extraordinary polarized light ray.

2. The optical pickup apparatus of claim 1, wherein the light source device comprises a light source to emit a light flux having the wavelength of λ1 and a switching member to change a polarization direction of a transmitted light ray of the light flux having the wavelength of λ1.

3. The optical pickup apparatus of claim 2, wherein the switching device is arranged to change the polarization direction of the transmission light rays 90 degrees ±5 degrees by a liquid crystal.

4. The optical pickup apparatus of claim 2, wherein the switching member comprises a λ/2 wavelength plate and a mechanism for rotating the λ/2 wavelength plate 45 degrees ±5 degrees centering on an optical axis.

5. The optical pickup apparatus of claim 1, wherein the light source device comprises a first light source to emit a light flux of an ordinary polarized light ray having the wavelength of λ1 and a second light source to emit a light flux of an extraordinary polarized light ray having the wavelength of λ1.

6. The optical pickup apparatus of claim 1, wherein the phase structure has a cross section having a concave/convexity shape of saw-tooth form and is filled with a medium having a refractive index $n_s$ being substantially equal to the refractive index of $n_0$ or $n_e$.

7. The optical pickup apparatus of claim 1, wherein the phase structure has a structure having a pattern shaped in a stepping shape in a cross section including an optical axis arranged in a concentric circle shape, and the pattern is filled with a medium having refractive index $n_o$ or refractive index $n_s$ being substantially equal to refractive index $n_e$.

8. The optical pickup apparatus of claim 1, wherein the phase structure has a pattern shaped in a stepping structure in a cross section including an optical axis arranged in a concentric circle shape, and a phase difference between ordinary polarized light rays or extraordinary polarized light rays having wavelength λ1 generated by a concave structure and a convex structure of each step of the stepping shape is an integral multiplication of 2π.

9. The optical pickup apparatus of claim 1, wherein the phase structure has a pattern shaped in a stepping structure in a cross section including an optical axis arranged in a concentric circle shape, the pattern being filled with a material having refractive index $n_s$ ($n_s \neq n_o$, $n_s \neq n_e$), and a phase difference between polarized stationary light rays or extraordinary polarization light rays having wavelength λ1 generated by a concave structure and a convex structure of each step of the stepping shape is an integral multiplication of 2π.

10. The optical pickup apparatus of claim 1, wherein the wavelength λ1 is 380 nm to 450 nm.

11. The optical pickup apparatus of claim 10, wherein the thickness t1 and t2 satisfy the formula of (t1<t2), and the light converging optical system converges an ordinary polarized light ray onto the first optical information recording medium without changing a transmitted wavefront of the ordinary polarized light ray and converges an extraordinary polarized light ray onto the second optical information recording medium by changing a transmitted wavefront of the extraordinary polarized light ray.

* * * * *